United States Patent [19]

Araki et al.

[11] Patent Number: 5,248,522
[45] Date of Patent: Sep. 28, 1993

[54] METHOD OF MANUFACTURING ANTISTATIC POLYESTER FILM

[75] Inventors: Hiromitsu Araki; Takatoshi Yajima; Eiichi Ueda, all of Hino, Japan

[73] Assignee: Konica Corporation, Tokyo, Japan

[21] Appl. No.: 753,967

[22] Filed: Sep. 3, 1991

[30] Foreign Application Priority Data

Sep. 5, 1990 [JP] Japan ................... 2-236855

[51] Int. Cl.$^5$ ............................. B05D 3/12
[52] U.S. Cl. ................... 427/173; 427/172; 427/302; 427/316; 427/393.5; 427/412.5
[58] Field of Search ............ 427/173, 343.5, 412.5, 427/393.1, 316, 302, 172

[56] References Cited

U.S. PATENT DOCUMENTS

| | | | |
|---|---|---|---|
| 4,048,357 | 9/1977 | VonPaesschen et al. | 427/412.5 |
| 4,066,820 | 1/1978 | Kelly et al. | 427/412.5 |
| 4,087,574 | 5/1978 | Yamaguchi et al. | 427/412.5 |
| 4,576,981 | 3/1986 | Hilger et al. | 427/412.5 |

*Primary Examiner*—Janyce Bell
*Attorney, Agent, or Firm*—Frishauf, Holtz, Goodman & Woodward

[57] ABSTRACT

A method for manufacturing a polyester film is disclosed which comprises a polyester film before completion of orienting crystalization and, provided thereon, a sublayer comprising a copolymer containing 70 to 99.5 wt % of vinylidene chloride, and an antistatic layer comprising an ionic polymer, in that order. A coating solution is coated on the polyester film to form the sublayer with a dry thickness of 1 to 20 g/m$^2$. The total solid content of the coating solution is not less than 4 wt %, and the coating solution contains a latex of the copolymer with an average particle size of 0.05 to 0.3 μm. Heat is applied at a temperature not less than 30° higher than the melting point of the copolymer, and the antistatic layer is formed on the sublayer.

10 Claims, No Drawings

METHOD OF MANUFACTURING ANTISTATIC POLYESTER FILM

FIELD OF THE INVENTION

The present invention relates to a plastic film excellent in antistatic property and adhesion to a coating layer provided thereon.

BACKGROUND OF THE INVENTION

In general, plastic films have a strong tendency to be electrified, which places various restrictions on their uses. In silver halide photographic light-sensitive materials, for example, supports such as polyester films are generally used; therefore, these light-sensitive materials are liable to be electrified especially in a low humidity climate such as winter. In the recent tendency of photographic industry to use high speed coating of high-speed photographic emulsions and to expose high-speed light-sensitive materials through automatic printers, appropriate antistatic measures cannot be dispensed with.

When a light-sensitive material is electrified, it comes to cause static marks by discharging the accumulated electricity or to attract foreign matters such as dust which causes pinholes, and thereby the quality is deteriorated to a marked degree. If such troubles once occur, the correction thereof impairs the work efficiency greatly.

As antistatic measures for plastic films, there have been employed a method to incorporate an anionic compound such as organic sulfonate or organic phosphate, a method to vapor-deposit a metal compound, and a method to coat an anionic compound, cationic compound or so-called conductive compound. The method of incorporating an anionic compound is inexpensive, but cannot provide an enough antistatic effect. Further, it has disadvantages attributable to low molecular weights of the compounds to be incorporated; namely, it is liable to cause blooming, lowering in adhesion to a coating layer, poor water resistance and migration of said compound. The vapor deposition of metal compounds can provide an good antistatic property and has come to be used as a method to prepare a transparent conductive film, but it needs a high manufacturing cost. A method to coat a conductive carbon black or a conductive metal particles can impart a good antistatic property at a relatively low cost, but film transparency is lowered.

Under these circumstances, there is generally used the method to coat an anionic compound or cationic compound on a plastic film.

As antistatic agents for the light-sensitive material, there are recently used fluorine-containing surfactants, cationic surfactants, amphoteric surfactants, polyethylene-oxide-group-containing surfactants or polymers, and polymers containing a sulfonic group or phosphoric group in the molecule.

Particularly, control of electrification rank with a fluorine-containing surfactant and conductivity enhancement with a conductive polymer have come to be widely used. For example, Japanese Pat. O.P.I. Pub. Nos. 91165/1974 and 121523/1974 disclose the use of ionic polymers having a dissociated group in the principal chain.

However, these conventional methods cannot avoid a sharp drop in antistatic property in the course of development. This is attributed to the reduction of antistatic property in the processes of developing with alkaline compounds, fixing in an acid medium, and washing. Therefore, troubles such as generation of pinholes due to adsorption of dust are liable to occur, when printing is made using a film processed beforehand like a light-sensitive material for printing.

As a measure to prevent such a problem, an antistatic layer consisting of a carboxyl-group-containing hydrophobic polymer and a polyfunctional aziridine is proposed in Japanese Pat. O.P.I. Pub. Nos. 84658/1980 and 174542/1986. In this method, the antistatic property can be retained after development. But this method has a disadvantage that the antistatic layer is poor in adhesion to a hydrophilic colloid layer such as an antistatic layer coated on a plastic film including polyester film.

On the other hand, Japanese Pat. Exam. Pub. No. 3437/1955 and Japanese Pat. O.P.I. Pub. Nos. 57722/1984 and 250041/1985 disclose techniques to enhance a barrier property against water and gases and to improve dimensional stability and water resistance by coating a vinylidene chloride copolymer layer on a polyester film.

However, these techniques have a problem in the balance between the barrier property and the adhesive property, and therefore enhancement of the barrier property tends to weaken the adhesive property.

SUMMARY OF THE INVENTION

Under such conditions, the object of the present invention is to provide an antistatic plastic film excellent in antistatic capability, high in water resistance when coated with a hydrophilic layer such as a light-sensitive material, and free from deterioration in adhesive property.

The object of the invention is attained by a method for manufacturing a film comprising a polyester film before completion of orienting crystalization and, provided thereon, a sublayer comprising a copolymer containing 70 to 99.5 wt % of vinylidene chloride and an antistatic layer comprising an ionic polymer in that order, comprising the steps of; coating a coating solution on the polyester film to form the sublayer having a dry thickness of 1 to 20 $g/m^2$, the total solid content of said coating solution being not less than 4 wt %, and said coating solution containing a latex of said copolymer having an average particle size of 0.05 to 0.3 $\mu m$, applying heat at a temperature not less than 30° C. higher than the melting point of said copolymer, and forming the antistatic layer on the sublayer.

DETAILED DESCRIPTION OF THE INVENTION

Ionic high molecular compounds usable in the invention include anionic high molecular compounds described in Japanese Pat. Exam. Pub. Nos. 23828/1974, 23827/1974, 28937/1972; ionene type polymers having a dissociated group on the principal chain as seen in Japanese Pat. Exam. Pub. Nos. 734/1980, 14735/1984, 18175/1982, 18176/1982, 56059/1982 Japanese Pat. O.P.I. Pub. No. 54672/1975; and cationic pendant type polymers having a cationic dissociated group on the side chain as described in Japanese Pat. Exam. Pub. Nos. 13223/1978, 15376/1982, 56858/1983, Japanese Pat. O.P.I. Pub. Nos. 45231/1978, 145783/1980, 65950/1980, 67746/1980, 11342/1982, 19735/1982.

Particularly preferred ionic high molecular compounds are those polymers which have a structural unit represented by Formulas I, II-A or II-B:

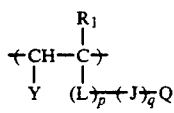
Formula I

In the formula, $R_1$ represents a hydrogen atom, an alkyl group having 1 to 4 carbon atoms, a halogen atom or a $-CH_2COO^{\ominus} M^{\oplus}$ group.

Y represents a $-COO^{\ominus} M^{\oplus}$ group or a hydrogen atom.

L represents a $-CONH-$, $-COO-$, $-CO-$ or $-O-$ group.

J represents a divalent group having a substituted or unsubstituted an alkylene group of 1 to 12 carbon atoms, an arylene group, an alkylenearylene group or an arylenealkylene group.

Q represents an ionic group; examples thereof include $-O^{\ominus} M^{\oplus}$, $-SO_3^{\ominus} M^{\oplus}$,

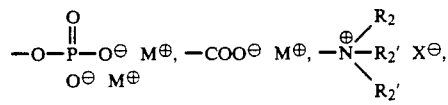

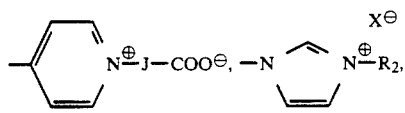

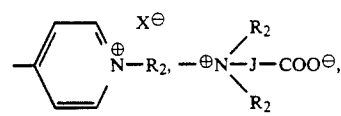

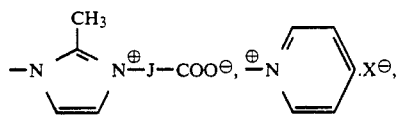

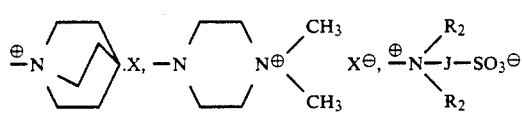

M represents a hydrogen atom or a cation.
$R_2$ and $R_2'$ independently represent a substituted or unsubstituted alkyl group having 1 to 4 carbon atoms; preferred examples thereof are a methyl, ethyl or propyl group.
p and q are each an integer of 0 or 1.
X represents an anion.

Formula II-A $$\left(\begin{array}{cc} R_3 & R_5 \\ | \oplus & | \oplus \\ N-A-N-B \\ | & | \\ R_4 & R_6 \\ & 2X^{\ominus} \end{array}\right)$$

Formula II-B $$\left(-D\overset{\oplus}{-}N\underset{C}{\overset{\diagdown}{=}} \quad Z_1-E-Z_2 \quad \overset{C}{\underset{N}{\diagdown}}-\right)_n$$
$X^{\ominus}$ $X^{\ominus}$ In these formulas, $R_3$, $R_4$, $R_5$ and $R_6$ independently represent a substituted or unsubstituted alkyl group having 1 to 4 carbon atoms; $R_4$ and $R_6$ may link to each other to form a nitrogen-containing heterocycle. A, B and D individually represent a substituted or unsubstituted alkylene group having 2 to 10 carbom atoms (the alkylene group may have an arylene group in the middle), an arylene group, an alkenylene group, an arylenealkylene group or an alkylenearylene group or $-R_7COR_8-$, $-R_9COOR_{10}OCOR_{11}-$, $-R_{12}OCOR_{13}COOR_{14}-$, $-R_{15}-(OR_{16})-_m$, $-R_{17}CONHR_{18}NHCOR_{19}$, $-R_{20}OCONHR_{21}NHCOR_{22}$, or $-R_{23}NHCONHR_{24}NHCONHR_{25}$; where $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$ and $R_{25}$ each represent an alkylene group; $R_{10}$, $R_{13}$, $R_{18}$, $R_{21}$ and $R_{24}$ each represent a connecting group selected from a substituted or unsubstituted alkylene, alkenylene, arylene, arylenealkylene and alkylenearylene group. m represents a positive integer of 1 to 4. $X^{\ominus}$ represents an anion.

However, it is preferable that when A is an alkylene, hydroxyalkylene or arylenealkylene group, B be not an alkylene, hydroxyalkylene or arylalkylene group.

E represents a simple connecting group or $-NHCOR_{25}CONH-$, or a group selected from D; where $R_{26}$ is a substituted or unsubstituted alkylene, alkenylene, arylene, arylenealkylene or alkylenearylene group.

$Z_1$ and $Z_2$ represent a group of non-metal atoms necessary to form a five- or six-membered ring together with $-N=C-$ group (or these may link to E in the form of a quaternary ammonium salt

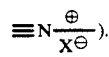).

n represents an integer of 5 to 300.

Typical examples of preferred ionic high molecular compounds having a strucrural unit represented by Formula I, II-A or II-B are illustrated below. Ionic high molecular compounds having a strucrural unit represented by Formula II-A or II-B

IP-1

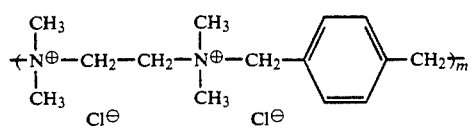

$m \approx 20$

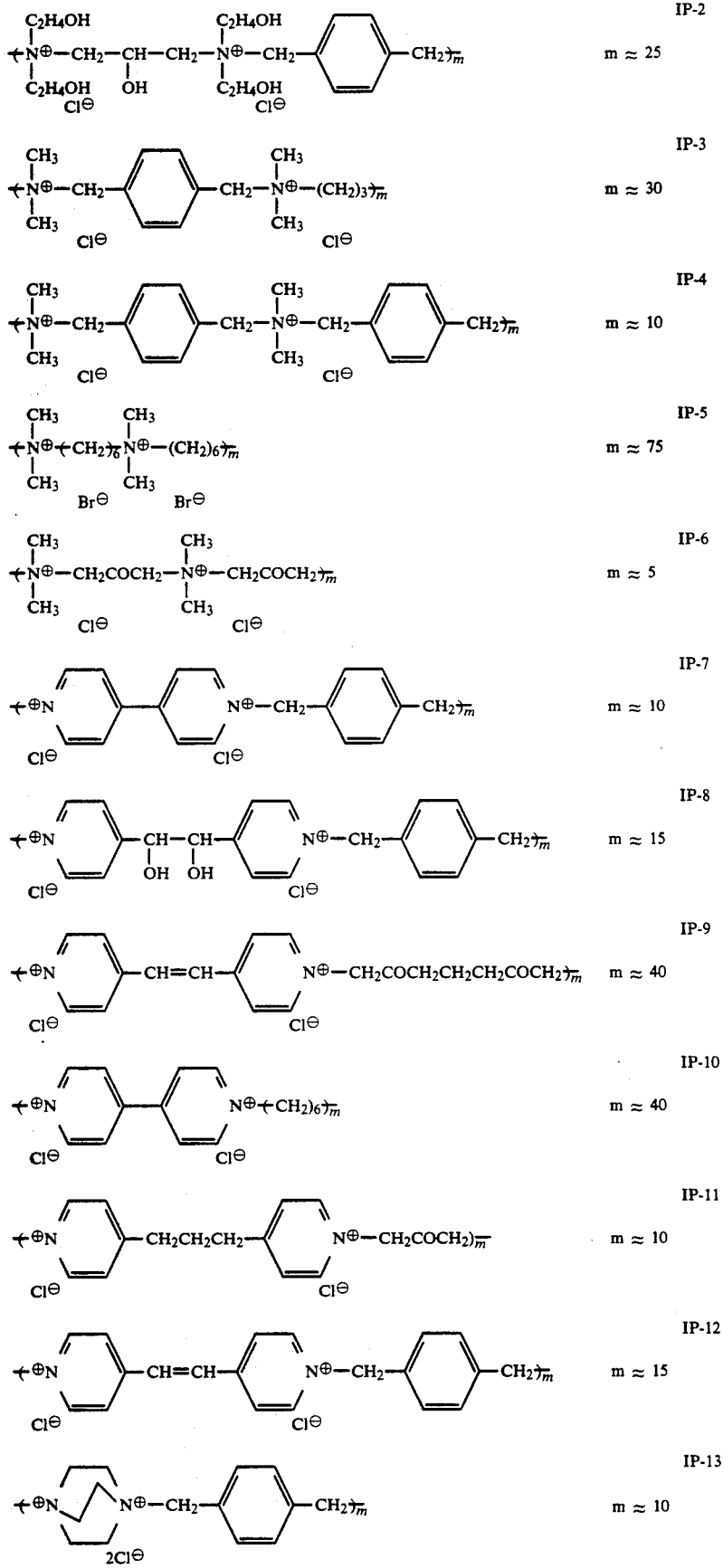

-continued
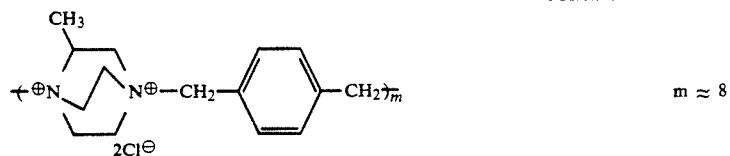
IP-14  m ≈ 8
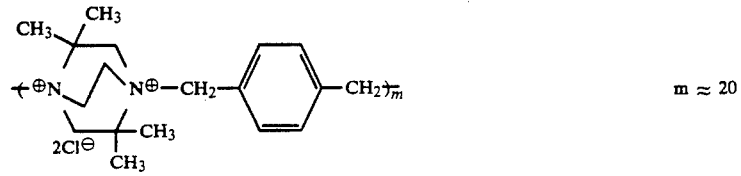
IP-15  m ≈ 20
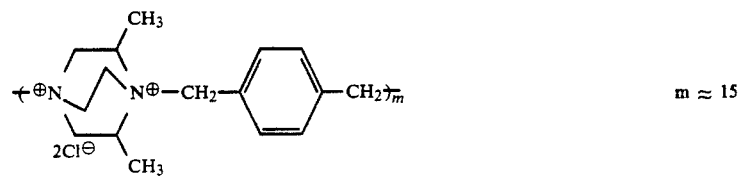
IP-16  m ≈ 15
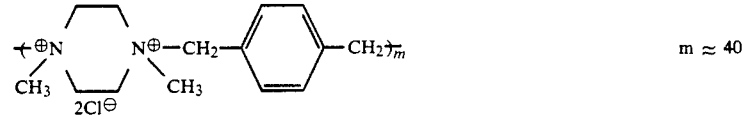
IP-17  m ≈ 40
IP-18  m ≈ 8
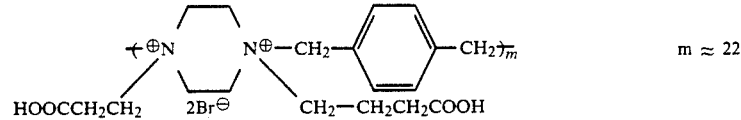
IP-19  m ≈ 22
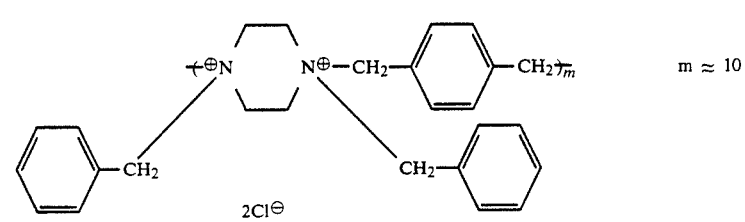
IP-20  m ≈ 10
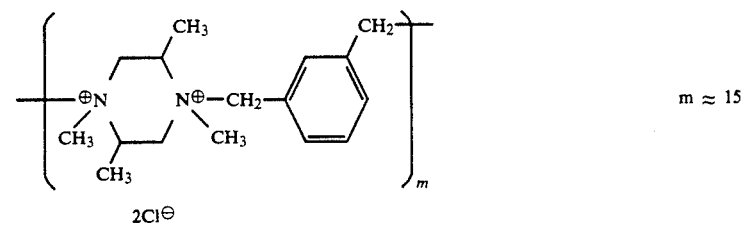
IP-21  m ≈ 15
Ionic high molecular compounds having a structural unit represented by Formula I
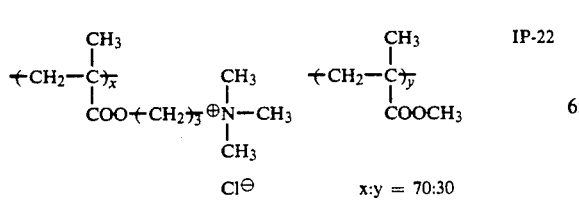
IP-22  x:y = 70:30
-continued
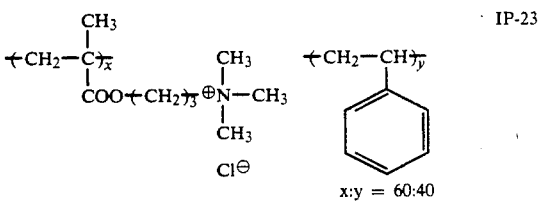
IP-23  x:y = 60:40

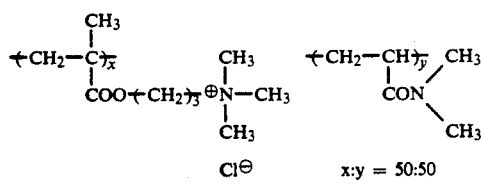 IP-24

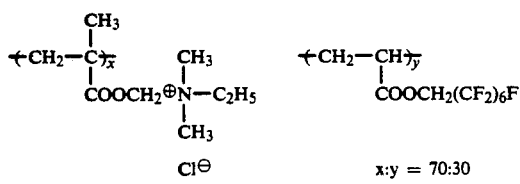 IP-25

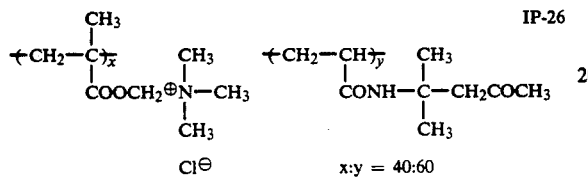 IP-26

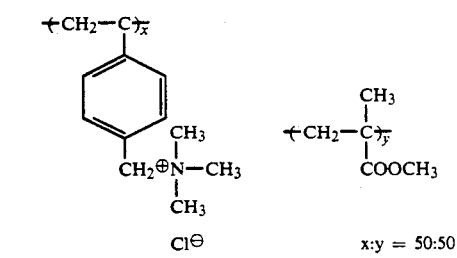 IP-27

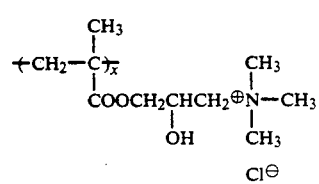 IP-28

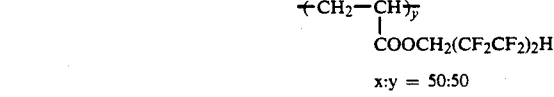

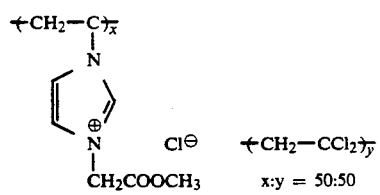 IP-29

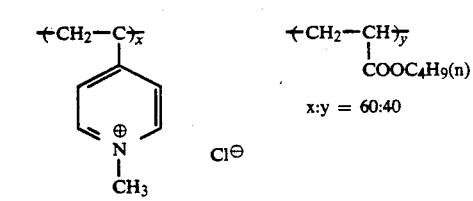 IP-30

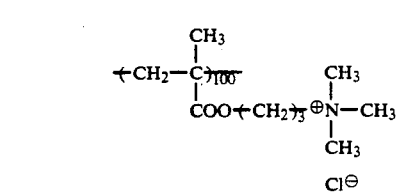 IP-31

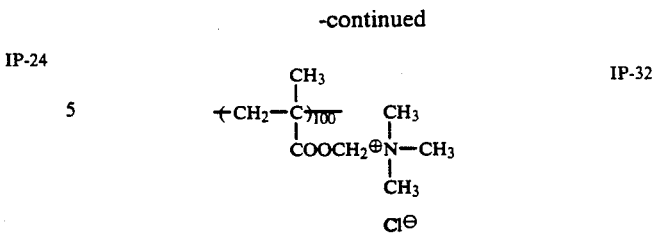 IP-32

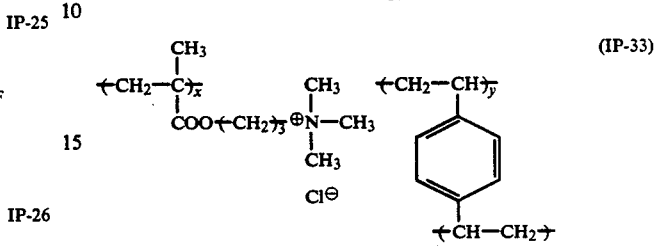 (IP-33)

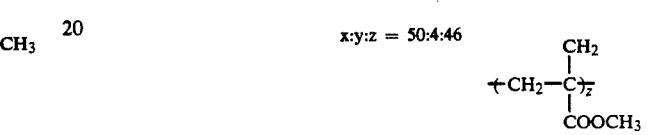

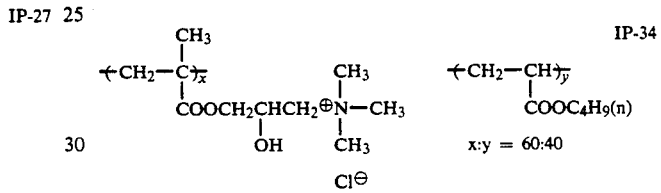 IP-34

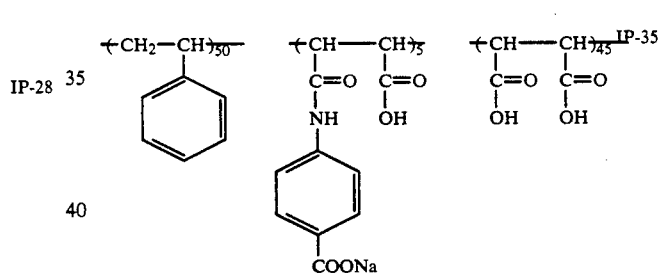 IP-35

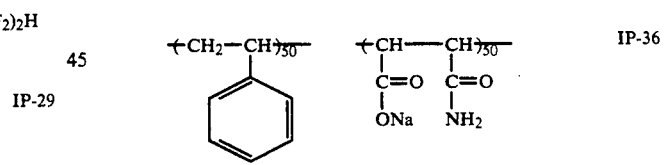 IP-36

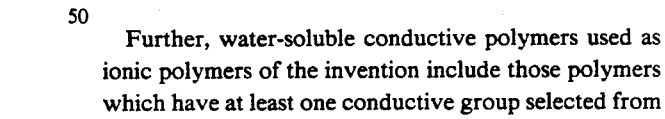
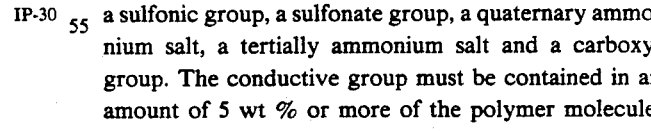
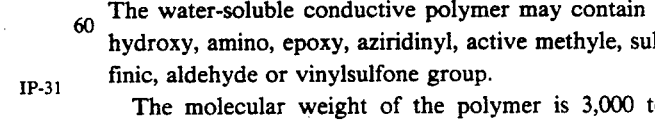
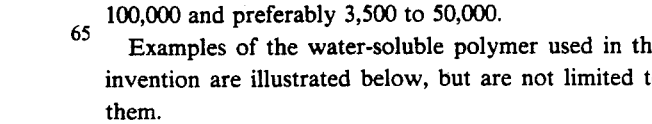

Further, water-soluble conductive polymers used as ionic polymers of the invention include those polymers which have at least one conductive group selected from a sulfonic group, a sulfonate group, a quaternary ammonium salt, a tertially ammonium salt and a carboxyl group. The conductive group must be contained in an amount of 5 wt % or more of the polymer molecule. The water-soluble conductive polymer may contain a hydroxy, amino, epoxy, aziridinyl, active methyle, sulfinic, aldehyde or vinylsulfone group.

The molecular weight of the polymer is 3,000 to 100,000 and preferably 3,500 to 50,000.

Examples of the water-soluble polymer used in the invention are illustrated below, but are not limited to them.

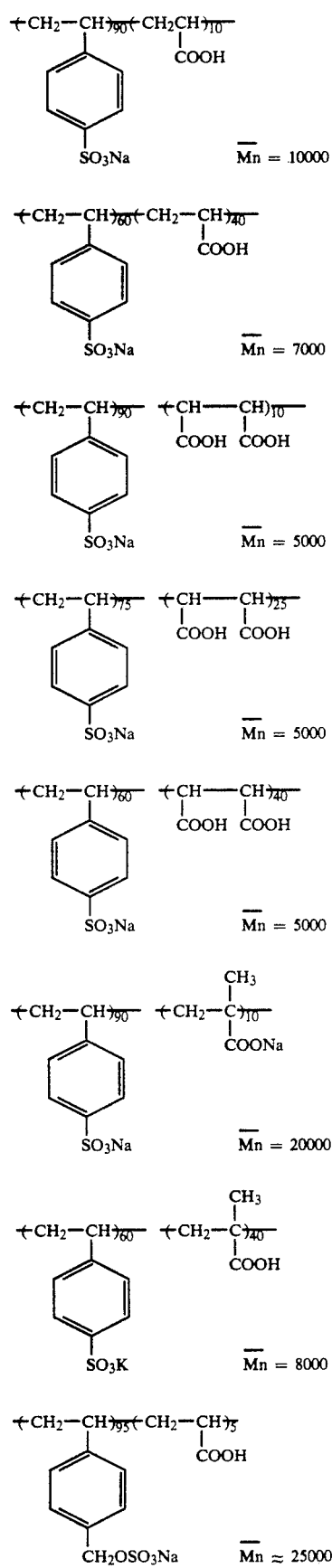
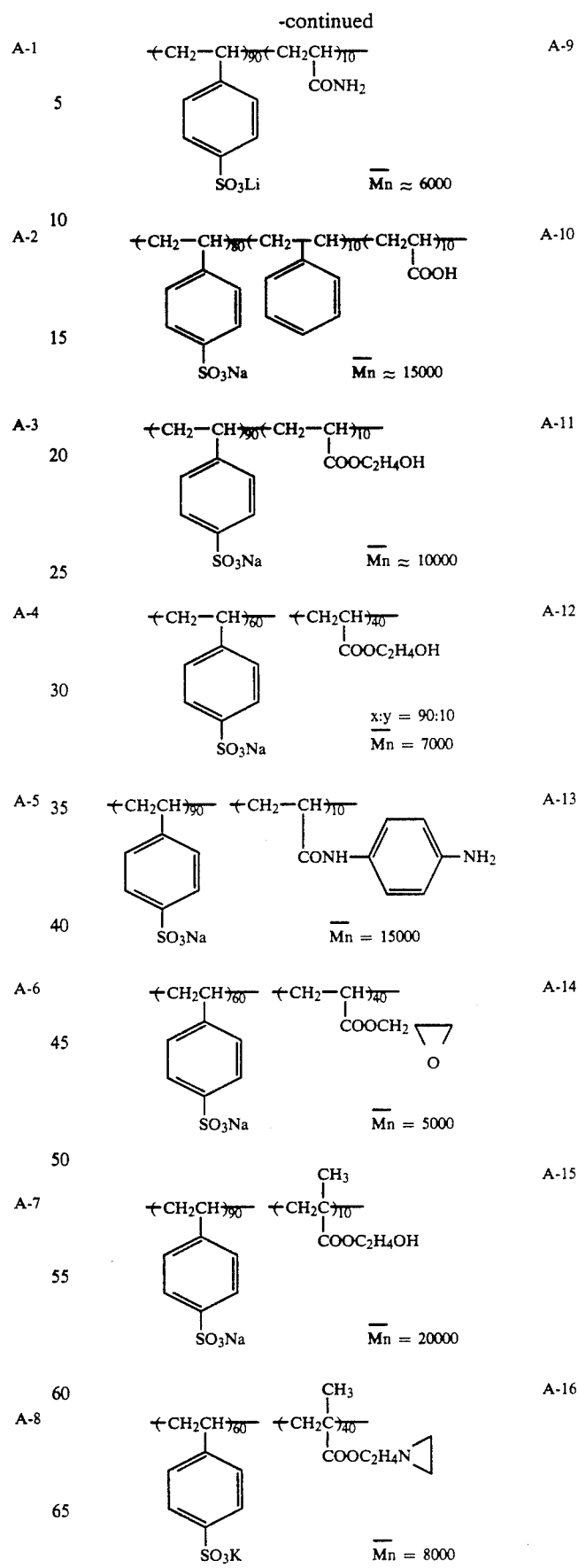

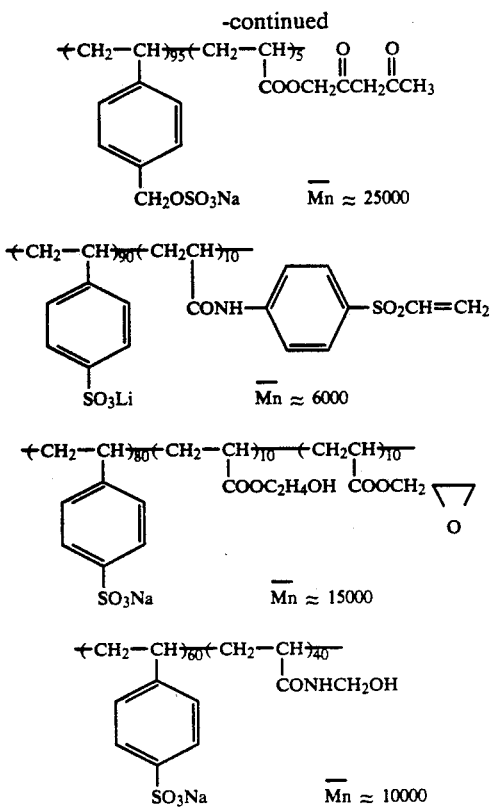

In the above exemplifications of A-1 to A-20, $\overline{Mn}$ means an average molecular weight (in the present specification, the average molecular weight means a number-average molecular weight) which is determined by GPC as a molecular weight converted into a polyethylene glycol.

These ionic high molecular compounds are used, singly or in combination of several types, preferably in a range of 0.005 to 2.0 g/m² and especially in a range of 0.01 to 1.0 g/m².

In the invention, the term "polyester film before completion of orienting crystallization" indicates an undrawn polyester film obtained by melting a polymer and forming it into film without applying any tension, a uniaxial oriented polyester film obtained by drawing the above undrawn film in the longitudinal direction or lateral direction, or a biaxial oriented polyester film which is drawn in both the longitudinal and lateral directions but not yet subjected to redrawing in either the longitudinal or lateral direction to complete the orienting crystallization.

In one embodiment of the invention, coating of a vinylidene chloride latex may be made in two steps; that is, the latex is coated at least on one side of a polyester film not subjected to drawing at all, and after uniaxial drawing of the film, the latex is coated again at least on that side of the film.

Further, the coating may be also carried out by applying the latex at least on one side of a uniaxial oriented polyester film, and after drying, applying the latex again at least on that side of the film.

The content of vinylidene chloride in the vinylidene chloride copolymer is 70 to 99.5 wt %, and preferably 85 to 95 wt %.

In order to obtain a satisfactory barrier property and film forming property, the particle size of the latex used is within a range of 0.05 to 0.3 μm, preferably 0.1 to 0.13 μm.

The total solid content of a coating solution is 4 wt % or more. But the content more than 50 wt % increases the viscosity of a latex, and thereby the coating property of the latex is impaired.

The heat treatment is carried out at a temperature at least 30° C. higher than the melting point of a vinylidene chloride latex according to the invention; preferably, it is made at 180° to 240° C. which is at least 60° C. higher than the melting point.

Prior to the coating with a vinylidene chloride latex, the surface of a polyester film may be subjected to oxidation treatment and/or coating with an anchor coating agent (hereinafter referred to as an AC agent). As an AC agent, there may be used a conventional acrylic resin emulsion or an organic solvent solution thereof, or an organic solvent solution of a urethane or polyester adhesive.

As monomers copolymerizable with vinylidene chloride into a vinylidene chloride copolymer of the invention, there may be used at least one monomer selected from vinyl chloride, vinyl acetate, acrylonitrile, methacrylonitrile, methyl acrylate, ethyl acrylate, propyl acrylate, butyl acrylate, octyl acrylate, 2-ethylhexyl acrylate, methyl methacrylate, acrylic acid, methacrylic acid, itaconic acid, sodium styrenesulfonate and methoxypolyethylene glycol methacrylate. Of course, types and amounts of these monomers must be appropriately selected to satisfy the heat treatment conditions of a resulting copolymer or its glass transition point.

Polymerization of these vinylidene chloride copolymer latices is carried out at a temperature range of 40° to 80° C., in the presence of a conventional anionic emulsifier, a nonionic emulsifier or a mixture of them.

These vinylidene chloride copolymer latices may contain an inorganic powder such silica, calcium carbonate, talc or clay, as an antiblocking agent; a wax; and a pigment or dye.

The coating weight of the latex is not particularly limited. But in general, an amount suitable for coating at a time; namely, 1 to 20 g/m² as a polymer component is preferred. The latex is coated on a film and dried, then the coated film is subjected to heat treatment, cooled to room temperature and wound into a roll. The heat treatment is carried out for 0.5 to 30 seconds using a heating means such as hot air, infrared rays or a hot roll.

When a drawn composite film is prepared by combination of coating of a vinylidene chloride latex and drawing of a film, it is preferable that a film be drawn uniaxilly or biaxially after being coated and dried and subsequently the heat treatment be carried out. Of course, the heat treatment may also be made at the time of drawing or neat-setting.

Silver halide emulsions used in the invention may be stabilized with compounds described, for example, in U.S. Pat. Nos. 2,444,607, 2,716,062, 3,512,982, 3,342,596, German Offenlegunshrift Nos. 1,189,380, 2,058,626, 2,118,411, 2,149,789 and Japanese Pat. Exam. Pub. Nos. 4133/1968, 4417/1972, 2825/1964, 13566/1974, such as 5,6-trimethylene-7-hydroxy-S-triazolo(1,5-a)pyrimidine, 5,6-tetramethylene-7-hydroxy-S-triazolo(1,5-a)pyrimidine, 5-methyl-7-hydroxy-S-triazolo(1,5-a)pyrimidine, 7-hydroxy-S-triazolo(1,5-a)pyrimidine, 5-methyl-6-bromo-7-hydroxy-S-triazolo(1,5-a)pyrimidine, gallates (for example, isoamyl gallate, dodecyl gallate, propyl gallate, sodium gallate), mercaptanes (for example, 1-phenyl-5- mercaptotetrazole, 2-mercaptobenzothiazole), benzotriazoles (for example, 5-bromobenzotriazole, 5-methylbenzotriazole), and benzimidazoles (for example, 6-nitrobenzimidazole).

The silver halide photographic light-sensitive material according to the invention and/or a developer thereof may contain an amino compound.

Further, there may be contained in the emulsion side a developing agent such as phenidone, hydroquinone, an inhibitor such as benzotriazole for improving the developing propertry. Also, there may be contained in a backing layer a developing agent and an inhibitor, in order to enhance the processing capability of a processing solution.

In the invention, gelatin is advantageously used as a hydrophilic colloid.

The gelatin used in the invention may be either an alkali-treated gelatin or an acid-treated gelatin. When ossein gelatin is used, it is preferable to remove calcium and iron components. Acceptable contents of these substances are 1 to 999 ppm and preferably 1 to 500 ppm for calcium, and 0.01 to 50 ppm and preferably 0.1 to 10 ppm for iron. Such control of calcium and iron quantities can be made by passing an aqueous solution of gelatin through an inon exchange equipment. As developing agents used in development of a silver halide photographic light-sensitive material according to the invention, there can be used catechol, pyrogallol and derivatives thereof, ascorbic acid, chlorohydroquinone, bromohydroquinone, methylhydroquinone, 2,3-dibromohydroquinone, 2,5-diethylhydroquinone, 4-chlorocatechol, 4-phenylcatechol, 3-methoxycatechol, 4-acetyl-pyrogallol and sodium ascorbate.

As $HO-(CH=CH)n-NH_2$ type developing agents, ortho and para aminophenols are typical ones. Examples thereof include 4-aminophenol, 2-amino-6-phenylphenol, 2-amino-4-chloro-6-phenylphenol and N-methyl-p-aminophenol.

Further, $H_2N-(CH=CH)_n-NH_2$ type developing agents are, for example, 4-amino-2-methyle-N,N-diethylaniline, 2,4-diamino-N,N-diethyaniline, N-(4-amimo-3-methylphenyl)-morpholine and p-phenylenediamine.

Examples of heterocyclic developing agents include 3-pyrazolidones such as 1-phenyl-3-pyrazolidone, 1-phenyl-4,4-dimethyl-3-pyrazolidone, 1-phenyl-4-methyl-4-hydroxymethyl-3-pyrazolidone; and
1-phenyl-4-amino-5-pyrazolone and 5-amino uracil.

Preferred developing agents are those described in The Theory of Photographic Process, Fourth Edition, by T. H. James, pp. 291-334, and Journal of the American Chemical Society, vol 73 (1951), p 3,100. These developing agents may be used either singly or in combination, but preferably in combination. Further, a developer used in development of a light-sensitive material according to the invention may contain a sulfite, such as sodium sulfite or potassium sulfite, as preservative without impairing the effect of the invention. Other preservatives, such as hydroxylamine and hydrazide compounds, may also be employed in an amount of 5 to 500 g, preferably 20 to 200 g per liter of developer.

The developer may also contain, as organic solvents, glycols such as ethylene glycol, diethylene glycol, propylene glycol, triethylene glycol, 1,4-butanediol and 1,5-pentanediol. These glycols are used singly or in combination, in an amount of 5 to 500g and preferably 20 to 200 g per liter of developer.

The silver halide photographic light-sensitive material according to the invention can have a high storage stability by being developed in a developer containing the above developing inhibitor.

The pH of a developer containing the above compounds is preferably 9 to 13, especially 10 to 12 in view of the preservability and photographic properties. As cations in the developer, a high potassium content is preferable to a high sodium content in enhancing the activity of a developer.

The silver halide photographic light-sensitive material according to the invention may be processed under various conditions. The processing temperature, for example, the developing temperature is preferably less than 50° C., especially in a range of 25° to 40° C. The developing is generally completed within two minutes, and developing in 10 to 50 seconds yields favorable results. There may be arbitrarily used processes other than developing, such as washing, stopping, stabilizing and fixing, or prehardening and neutralizing according to a specific requirement. These may also be omitted. Further, the processing of the light-sensitive material may be a manual development such as dish development or frame development, or a mechanical development such as roller development or hanger development.

EXAMPLES

EXAMPLE 1

A sample was prepared as follow:

Film A

An undrawn film (thickness: 1,000 μm) obtained by quenching, on a cooling drum, polyethylene terephthalate extruded at 280° C. into a film-shape from a T-die was preheated to 75° C., longitudinally drawn (threefold) and then subjected to corona discharge. Next, the film was coated on both sides with a 38.4 wt % latex solution consisting of vinylidene chloride/methyl acrylate/methyl methacrylate/acrylic acid (monomer ratio: 86.6/11.1/2.0/0.3 wt %) copolymer and dried on a tenter. After being preheated, the film was laterally drawn (threefold) at 100° C. and then subjected to heat setting at 220° C. The thickness of the latex coating layer was 0.9 μm on either side of the film. Film A was thus obtained.

EXAMPLE 2

Film B

Film B was prepared in the same manner as in Film A, except that there was used, instead of the latex used in Film A, a latex obtained by mixing the following vinylidene chloride copolymers (A), (B) and (C) in a ratio of 80:10:10. The thickness of the latex coating layer was 0.9 μm.

(A) Vinylidene chloride:methyl acrylate:methyl methacrylate:acrylic acid=86.6:11.1:2.0:0.3

(B) Vinylidene chloride:methyl acrylate:acrylic acid=98.0:1.0:1.0

(C) Vinylidene chloride:methyl acrylate:acrylic acid=65.0:34.0:1.0

COMPARATIVE EXAMPLE 1

Film C

Film C was prepared by subjecting a biaxial oriented polyester film to corona discharge, and then coating and drying on both sides of the film a latex consisting of vinylidene chloride/methyl acrylate/methyl methacrylate/acrylic acid (monomer ratio: 86.6/11.1/2.0/0.3 wt %) copolymer to a thickness of 0.9 μm.

COMPARATIVE EXAMPLE 2

Film D

Film D was prepared by repeating the procedure of Film A, except that the particle size of the latex was changed to 0.35 μm.

COMPARATIVE EXAMPLE 4

Film F

Film F was prepared in the same manner as in Film A, except that the composition of the latex was changed to vinylidene chloride/methyl acrylate/acrylic acid = 40/50/10.

Then, each of the above films was coated with the following antistatic layers (a), (b) and (c) separately as shown in Table 1.

| | (Antistatic layers) | |
|---|---|---|
| (a) | A coating solution, consisting of exemplified compound IP-1 of the invention, was coated to a thickness of 0.1 μm. | |
| (b) | A coating solution of the following composition was coated to a thickness of 1 μm | |
| | Polymer (A-5) | 10 g/l |
| | Latex (B$_1$) | 4 g/l |
| | Hardener (H$_1$) | 1.5 gl |
| | Latex (B$_1$): a polymer latex consisting of | |

$$-(CH_2-CH)_{\overline{95}}-(CH_2CH)_{\overline{5}}-$$
$$\phantom{xxxxxxxxxxx}|\phantom{xxxx}COO(C_2H_4O)_{\overline{10}}H$$
(phenyl group on first unit)

Hardener (H$_1$):

$$\left[\begin{array}{c}N-CNH(CH_2)_6NHCN\\ \parallel\phantom{xxxxxxxxx}\parallel\\ O\phantom{xxxxxxxxxx}O\end{array}\right]$$

| (c) | Polymer (A-4) | 70 g/l |
|---|---|---|
| | Latex (B$_2$) | 40 g/l |
| | Ammonium sulfate | 0.5 g/l |
| | Polyethylene oxide compound (molecular weight: 600) | 6.0 g/l |
| | Hardener (H$_2$) | 12.0 g/l |
| | Latex (B$_2$): | |
| | Hardener (H$_2$): a mixture of | |

$$-(CH_2-CH)_{\overline{40}}-(CH_2CH)_{\overline{5}}-(CH_2CH)_{\overline{10}}-(CH_2CH)_{\overline{5}}-(CH_2-\underset{\underset{COOC_4H_9\text{-}n}{|}}{\overset{\overset{CH_3}{|}}{C}})-$$
with substituents: phenyl, COOH, COOC$_4$H$_9$-n, NH$_2$ and (epoxy/polyether mixture structures shown) — 12.0 g/l

COMPARATIVE EXAMPLE 3

Film E

Film E was prepared in the same manner as in Film A, except that the heat-setting was not carried out.

Gelatin Coating Solution

The following coating solution was coated so as to give a gelatin coating weight of 3 g/m², on the laminated films each consisting of the above film and antistatic layer as shown in Table 1.

TABLE 1

| Sample No. | Film | Average particle size | Solid matter wt % | ΔT (°C.) | Antistatic layer | Adhesive property | Barrier property P | |
|---|---|---|---|---|---|---|---|---|
| 1 | A | 0.12 | 38.4 | 80 | a | 4 | 0.0040 | Invention |
| 2 | A | 0.12 | 38.4 | 80 | b | 4 | 0.0040 | Invention |
| 3 | A | 0.12 | 38.4 | 80 | c | 5 | 0.0040 | Invention |
| 4 | B | 0.13 | 38.4 | 80 | a | 5 | 0.0038 | Invention |
| 5 | B | 0.13 | 38.4 | 80 | b | 5 | 0.0038 | Invention |
| 6 | B | 0.13 | 38.4 | 80 | c | 5 | 0.0038 | Invention |
| 7 | C | 0.12 | 38.4 | 0 | a | 1 | 0.0041 | Comparison |
| 8 | C | 0.12 | 38.4 | 0 | b | 1 | 0.0041 | Comparison |
| 9 | C | 0.12 | 38.4 | 0 | c | 2 | 0.0041 | Comparison |
| 10 | D | 0.15 | 15.0 | 60 | a | 4 | 0.0150 | Comparison |
| 11 | D | 0.15 | 15.0 | 60 | b | 4 | 0.0150 | Comparison |
| 12 | D | 0.15 | 15.0 | 60 | c | 3 | 0.0150 | Comparison |
| 13 | E | 0.12 | 38.4 | — | a | 1 | 0.0200 | Comparison |
| 14 | E | 0.12 | 38.4 | — | b | 1 | 0.0200 | Comparison |
| 15 | E | 0.12 | 38.4 | — | c | 1 | 0.0200 | Comparison |
| 16 | F | 0.14 | 38.4 | 40 | a | 4 | 0.0310 | Comparison |
| 17 | F | 0.14 | 38.4 | 40 | b | 4 | 0.0310 | Comparison |
| 18 | F | 0.14 | 38.4 | 40 | c | 4 | 0.0310 | Comparison |

| | |
|---|---|
| Gelatin | 5 g |
| Sodium p-dodecylbenzenesulfonate | 50 mg |
| Gelatin hardener (1% aqueous solution of sodium 1-oxy-3,5-dichloro-s-triazine) | 5 ml |
| Water | 95 ml |

The samples prepared as above were evaluated for the adhesive property according to the following method. Adhesive property Cuts having a tilt of 45 degrees are made in the barrier layer of a film with a razor. Then, a strip of pressure-sensitive adhesive tape is sticked thereon and peeled off rapidly. The area peeled off from the barrier layer is rated by a five-rank method. (Rating standard)

1: thoroughly peeled off (very weak adhesion)
2: more than 50% of the layer is peeled off
3: 10 to 50% of the layer is peeled off
4: peeling is less than 10% of the layer (fairly good adhesion)
5: no peeling (very strong adhesion)

Films rated 4 or more are regarded to have an adequate adhesive property in practical use.

Barrier Property

A film (width: 70 mm, length: 1,000 mm) is conditioned in an environment of 23° C. and 20% RH for a time long enough to make the water content equilibrate. Then, the film is moved to an environment of 23° C. and 55% RH, and the change in film weight is measured from this point of time.

When the equilibrating value at 23° C. and 55% RH is denoted by $W^\infty$, the average value at 23° C. and 20% RH by $W_0$, and the film weight by $W$, and the time at which the following relation is satisfied is represented by $\theta$ (minute), $$\ln \frac{W - W^\infty}{W_0 - W^\infty} = -1,$$

$$p = \frac{1}{\theta}$$

is taken as the index of the barrier property.

The smaller the p value is, the better the barrier property is.

When surface specific resistances of these samples were measured, there was no substantial difference between samples having a polyvinylidene chloride layer between the polyester film and antistatic layer and samples having no in-between layer, and thereby it is confirmed that a desired antistatic property is maintained even when a polyvinylidene chloride layer is provided in between.

EXAMPLE 3

A longitudinally oriented polyethylene terephthalate film support was coated on both sides with the latex used in Film A as a coating solution, then it was dried and laterally oriented to obtain a coated biaxial oriented support. The coating thickness of the latex was set to be 0.9 μm after the lateral orienting. Next, antistatic layer (a) in Example 1 was coated in a thickness of 1.2 μm on one side of the support, and the other side was coated with a gelatin subbing layer of the following composition.

| | |
|---|---|
| Gelatin | 10 g |
| Reaction product of a polyamide made from diethylenetriamine and adipic acid with epichlorohydrin | 0.7 g |
| Saponin | 0.1 g |
| Water to make 1 liter | |

Using the polyester film thus obtained as a support, a light-sensitive material was prepared in the following manner.

Light-sensitive material A was prepared by forming an emulsion layer and protective layer of the following compositions on one side of the film, and a back coating layer (BC layer) of the following composition on the other side. The compositions of these photographic structural layers were as follows.

Silver Halide Emulsion Layer

There were prepared silver halide grains containing $10^{-5}$ mol per mol silver of rhodium by the controlled double-jet method in an acid environment of pH 3.0. The grains were grown in a system containing 30 mg of benzyladenine per liter of 1%-gelatin aqueous solution. After mixing the silver and halide, 600 mg per mol silver halide of 6-methyl-4-hydroxy-1,3,3a,7-tetrazaindene was added, and then the emulsion was washed and desalted.

Next, after adding 60 mg per mol silver halide of 6-methyl-4-hydroxy-1,3,3a,7-tetrazaindene, sulfur sensitization was conducted. Then, 6-methyl-4-hydroxy-1,3,3a,7-tetrazaindene was added thereto as a stabilizer.

The following additives were added to the above emulsion in amounts specified below. The coating solution thus obtained was coated on the polyethylene terephthalate film sample.

| | |
|---|---|
| Latex polymer (styrene/butyl acrylate/acrylic acid copolymer) | 1.0 g/m² |
| Tetraphenyl phosphonium chloride | 30 mg/m² |
| Saponin | 200 mg/m² |
| Polyethylene glycol | 100 mg/m² |
| Sodium dodecylbenzenesulfonate | 100 mg/m² |
| Hydroquinone | 200 mg/m² |
| Phenidone | 100 mg/m² |
| Sodium styrenesulfonate/maleic acid copolymer (Mw: 250,000) | 200 mg/m² |
| Butyl gallate | 500 mg/m² |
| 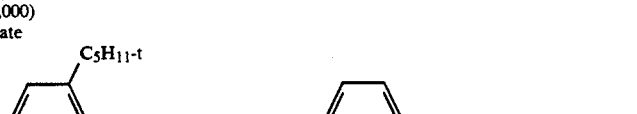 | 30 mg/m² |
| 5-Methylbenzotriazole | 30 mg/m² |
| 2-Mercaptobenzimidazole-5-sulfonic acid | 30 mg/m² |
| Inert ossein gelatin (isoelectric point: 4.9) | 1.5 g/m² |
| 1-(p-acetylamidophenyl)-5-mercaptotetrazole | 30 mg/m² |
| Silver amount | 2.8 g/m² |

Protective Layer

In forming a protective layer, a coating solution was prepared so as to give the following coating weight of each component.

| | |
|---|---|
| Fluorinated dioctylsulfosuccinate | 300 mg/m² |
| Matting agent: polymethylmethacrylate (average particle size: 3.5 μm) | 100 mg/m² |
| Lithium nitrate | 30 mg/m² |
| Acid-treated gelatin (isoelectric point: 7.0) | 1.2 g/m² |
| Colloidal silica | 50 mg/m² |
| Sodium styrenesulfonate/maleic acid coplymer | 100 mg/m² |
| Mordant: 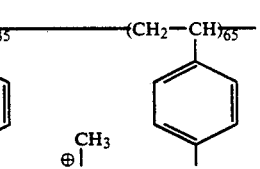 | |
| Dye: 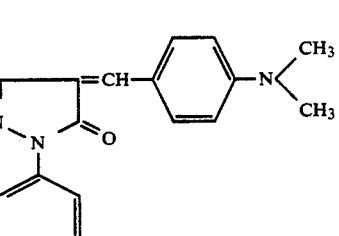 | |

Backing Layer

A backing layer containing a dye of the following structure was formed on the support in reverse of the emulsion layer. The layer was hardened with glyoxal and sodium 1-oxy-3,5-dichloro-s-triazine.

| | |
|---|---|
| Hydroquinone | 100 mg/m² |
| Phenidone | 30 mg/m² |
| Latex polymer: butyl acrylate/styrene/acrylic acid copolymer | 0.5 g/m² |
| Styrene/maleic acid copolymer | 100 mg/m² |
| Citric acid | 40 mg/m² |
| Benzotriazole | 100 mg/m² |
| Sodium styrenesulfonate/maleic acid copolymer | 200 mg/m² |
| Lithium nitrate | 30 mg/m² |
| Backing dye (a), (b) or (c) | |
| Ossein gelatin | 2.0 g/m² |
| (a) 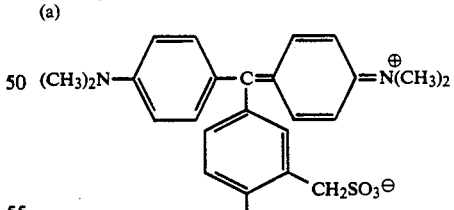 | 40 mg/m² |
| (b) 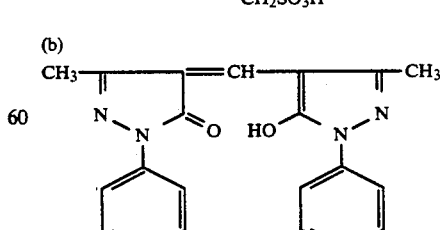 | 30 mg/m² |
| (c) 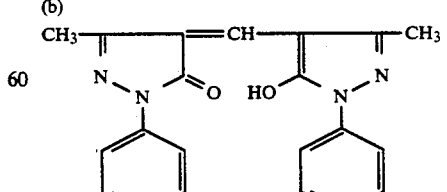 | |

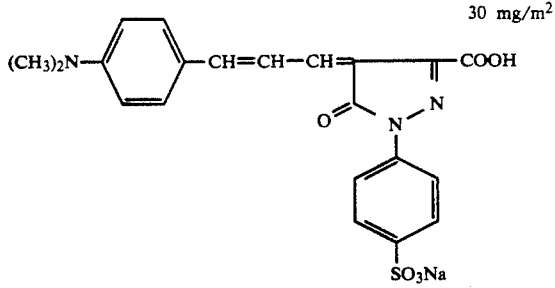

30 mg/m²

EXAMPLE 4

A polyester film was prepared in the same manner as in Example 2, except that the coating solution was changed to the coating solution for Film B. Using this film as a support for silver halide photographic light-sensitive material, light-sensitive material B having the same photographic structural layers as in Example 2.

COMPARATIVE EXAMPLE 5

Light-sensitive material C was prepared by forming the same photographic structural layers as in Example 2 on the support used in Comparative Example 2.

COMPARATIVE EXAMPLE 6

Light-sensitive material D was prepared by forming the same photographic structural layers as in Example 2 on the support used in Comparative example 3.

COMPARATIVE EXAMPLE 7

Light-sensitive material E was prepared by forming the same photographic structural layers as in Example 2 on the support used in Comparative example 4.

Light sensitive materials A to E were evaluated for the dimensional stability in the following manner.

Dimensional Stability

A silver halide emulsion for printing film was coated on the above barrier-provided polyester film. After cutting the sample into 30 cm × 60 cm sheets, one of the sheets was subjected to imagewise exposure of two fine lines with the space of about 56 cm using a day-light room printer P-627FM (product of Dainippon Screen) and then developed to obtain an original copy.

After conditioning the original copy, an unexposed sample (the same size as the original copy), the printer and the automatic developing machine for 10 hours at 23° C. and 20% RH, the original copy and the unexposed sample were subjected to contact (face to face) exposure and then processed in the automatic developing machine. After being conditioned for 10 hours, the developed sample was superposed on the original copy and examined, with a graduated magnifying lens, how much deviation was caused in the space between the two lines.

The examination of the deviation was made by measuring six times and an average was taken. Processing conditions in the automatic developing machine and compositions of the processing solutions were as follows:

| Developer recipe | |
|---|---|
| (composition A) | |
| Deionized water | 150 ml |
| Disodium ethylenediamine tetracetate | 2 g |
| Diethylene glycol | 50 g |
| Potassium sulfite (55% W/V aqueous solution) | 100 ml |
| Potassium carbonate | 50 g |
| Hydroquinone | 15 g |
| 5-Methylbenzotriazole | 200 mg |
| 1-Phenyl-5-mercaptotetrazole | 30 mg |
| Potassium hydroxide   an amount to make the pH | 10.6 |
| Potassium bromide | 4.5 g |
| (Composition B) | |
| Deionized water | 3 mg |
| Diethylene glycol | 50 g |
| Disodium ethylenediamine tetracetate | 25 mg |
| Acetic acid (90% aqueous solution) | 0.3 ml |
| Sodium 2-mercapto-benzimidazole-5-sulfonate | 50 mg |
| 1-Phenyl-3-pyrazolidone | 500 mg |

At use of the developer, composition A and composition B were dissolved in this order in 500 ml of water, then the total volume was made to 1 liter.

| Fixer recipe | |
|---|---|
| (Composition A) | |
| Ammonium thiosulfate | 230 ml |
| (72.5% W/V aqueous solution) | |
| Sodium sulfite | 9.5 g |
| Sodium acetate trihydrate | 15.9 g |
| Boric acid | 6.7 g |
| Sodium citrate dihydrate | 2 g |
| Acetic acid (90% W/V aqueous solution) | 8.1 ml |
| (Composition B) | |
| Deionized water | 17 ml |
| Sulfuric acid (50% W/V aqueous solution) | 5.8 g |
| Aluminium sulfate | 26.5 g |
| (8.1% W/V aqueous solution in $Al_2O_3$ equivalent) | |

At use of the fixer, composition A and composition B were dissolved in this order in 500 ml of water, then the total volume was made to 1 liter. The pH of the fixer was about 4.3.

[Rapid development processing conditions]

| (Process) | (Temperature) | (Time) | (Dipping time in solution) |
|---|---|---|---|
| Developing | 28° C. | 30 sec | 26 sec |
| Fixing | 28° C. | 26 sec | 22 sec |
| Washing | 18° C. | 18 sec | 18 sec |
| Drying | 45° C. | 14 sec | tot. 66 sec |

Each processing time contains a crossover time, but the dipping time in solution does not contain a crossover time.

TABLE 2

| | Change in dimension after processing | Remarks |
|---|---|---|
| Light-sensitive material A | +20 μm | Invention |
| Light-sensitive material B | +18 μm | Invention |
| Light-sensitive material C | +35 μm | Comparison |
| Light-sensitive material D | +30 μm | Comparison |
| Light-sensitive material E | +45 μm | Comparison |

What is claimed is:

1. In a method of manufacturing polyester film having anionic polymer antistatic layer wherein the film is formed and then subjected to at least one drawing for orienting crystallization, the improvement comprising providing on the film, a sublayer comprising a copolymer containing 70 to 99.5 wt % of vinylidene chloride, and an antistatic layer comprising an ionic polymer, in that order, by the steps of coating a coating solution on the polyester film to form the sublayer having a dry thickness of 1 to 20 g/m², the total solid content of said coating solution being not less than 4 wt %, and, dispersed in said coating solution, a latex of said copolymer having an average particle size of 0.05 to 0.3 μm, drawing the coated polyester film, heating the drawn polyester film to a temperature not less than 30° C. higher than the melting point of said copolymer, and thereafter, coating a coating solution containing an ionic polymer for forming the antistatic layer on the sublayer, to form the antistatic layer.

2. The method of claim 1, wherein the polyester film is a uniaxial oriented polyester film obtained by drawing an undrawn polyester film in the longitudinal or lateral direction.

3. The method of claim 1, wherein the polyester film is a biaxial oriented polyester film obtained by drawing an undrawn polyester film in both the longitudinal and lateral directions.

4. The method of claim 1, wherein the time of said step of applying heat is in the range of 0.5 to 30 seconds.

5. The method of claim 1, wherein the ionic polymer is a polymer having a structure unit represented by the following Formula I, II-A or II-B:

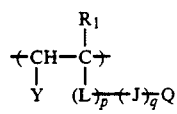

Formula I wherein $R_1$ represents an alkyl group having 1 to 4 carbon atoms, a hydrogen atom, a halogen atom or —$CH_2COOM$; Y represents a hydrogen atom or —COOM, wherein M represents a hydrogen atom or a cation; L represents —CONH—, —COO—, —CO— or —O—; J represents an alkylene group having 1 to 12 carbon atoms, an arylene group, an arylenealkylene group or an alkylenearylene group; Q represents an ionic group; and p and q each represent 0 or 1;

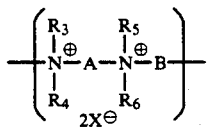

Formula II-A

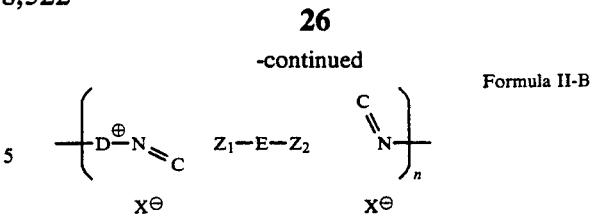

Formula II-B wherein $R_3$, $R_4$, $R_5$, and $R_6$ each represent an alkyl group having 1 to 4 carbon atoms, provided that $R_4$ and $R_6$ may bond together to form a nitrogen-containing heterocyclic ring; A, B and D each represent an alkylene group having 2 to 10 carbon atoms, an arylene group, an alkenylene group, an arylenealkylene group, an alkylenearylene group, —$R_7COR_8$—, —$R_9COOR_{10}OCOR_{11}$—, —$R_{12}OCOR_{13}COOR_{14}$, —$R_{15}$—($OR_{16}$)m—, —$R_{17}CONHR_{18}NHCOR_{19}$—, —$R_{20}OCONHR_{21}NHCOR_{22}$—, —$R_{23}NHCONHR_{24}NHCONHR_{25}$— wherein $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$ and $R_{25}$ each represent an alkyl group, $R_{10}$, $R_{13}$, $R_{14}$, $R_{21}$ and $R_{24}$ each represent an alkylene group, an arylene group, an alkenylene group, an arylenealkylene group, an alkylenearylene group, and m represents an integer of 1 to 4; E represents an alkylene group having 2 to 10 carbon atoms, an arylene group, an alkenylene group, an arylenealkylene group, an alkylenearylene group, —$R_7COR_8$—, —$R_9COOR_{10}OCOR_{11}$—, —$R_{12}OCOR_{13}COOR_{14}$, —$R_{15}$—($OR_{16}$)m—, —$R_{17}CONHR_{18}NHCOR_{19}$—, —$R_{20}OCONHR_{21}NHCOR_{22}$—, —$R_{23}NHCONHR_{24}NHCONHR_{25}$—, —$NHCOR_{26}CONH$— wherein $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$ and $R_{25}$ each represent an alkyl group, $R_{10}$, $R_{13}$, $R_{14}$, $R_{21}$, $R_{24}$ and $R_{26}$ each represent an alkylene group, an arylene group, an alkenylene group, an arylenealkylene group, an alkylenearylene group, and m represents an integer of 1 to 4; $Z_1$ and $Z_2$ represent a non-metallic atomic group necessary to form a 5 or 6 membered ring together with —N=C—; X represents an anion; and n represents an integer of 5 to 300.

6. The method of claim 1, wherein said copolymer is a vinylidenechloride /methylacrylate /methylmethacrylate /acrylic acid copolymer.

7. The method of claim 1, wherein said copolymer is a vinylidene chloride/methylacrylate/acrylic acid copolymer.

8. The method of claim 4 wherein the temperature is 180°–240° C.

9. The method of claim 5 wherein
the time of said step of applying heat is 0.5 to 30 second and the temperature is 180°–240° C.; and
the content of the ionic polymer in the antistatic layer is 0.005 to 2 g/m².

10. The method of claim 1 wherein the content of the ionic polymer in the antistatic layer is 0.005 to 2 g/m².

* * * * *